UNITED STATES PATENT OFFICE.

HARRY E. BROOKBY, OF EVANSTON, ILLINOIS.

PROCESS OF PRODUCING POTASSIUM COMPOUNDS.

1,297,078. Specification of Letters Patent. Patented Mar. 11, 1919.

No Drawing. Application filed October 7, 1918. Serial No. 257,289.

*To all whom it may concern:*

Be it known that I, HARRY E. BROOKBY, a citizen of the United States, residing at Evanston, in the county of Cook and State of Illinois, have invented a certain new and useful Process of Producing Potassium Compounds, of which the following is a specification.

My invention resides in a process of commercial production of water-soluble potassium compounds. In extracting potassium compound from potassium-containing silicates various metallic compounds, such as limestone, have been employed, these being mixed with the silicate and then heated to cause the metal of such compound to replace the potassium content of the silicate and hence leave the potassium compound in soluble form. With anhydrous silicates such as feldspar, leucite, etc., the replacement of the potassium compound does not take place to any appreciable extent below a temperature which causes a sintering of the mass unless subjected to this temperature for an excessive period of time. The result of subjecting the mixture to such high temperature is first, to volatilize a part of the potassium compound, which is carried away, and further to partially, if not wholly, fuse the mixture so that such portions of the potassium compound as have not been volatilized are mechanically imprisoned in the fused mass of insoluble silicate so that the potassium compound cannot be readily leached out.

I have discovered that by employing hydrous silicate in the form of potassium bearing clay, shale or slate as a source and treating it at a proper temperature and for a proper period of time in the presence of and mixed with a metal chlorid preferably common salt and limestone and by employing proper amounts of salt and limestone, it is possible to convert the potassium to soluble form and recover it by the leaching process without getting so much salt into the solution as to render the process commercially useless. Furthermore, by my process I recover practically all; e. g., about 90% of the potassium contained in the mineral. The use of clay, shale and slate as a source for obtaining potassium compounds is not broadly new, nor is it new, broadly, to use salt, or to use lime in treating silicates for the obtaining of potassium compounds. But my process is to be distinguished from purely laboratory methods and also from alleged commercial processes which are either different in principle or have characteristics which render them commercially valueless.

To give a concrete example of the manner of carrying out the process: I first determine the percentage of potassium oxid in the clay, shale or slate. Let it be assumed that the percentage is 5%. I then grind the mineral and mix it with common salt and a compound which will form a source of free alkali. In practice, I employ substantially the following proportions: mineral, *i. e.*, the hydrous silicate, 1600 pounds; salt 200 pounds; limestone 400 pounds. It will be observed that the potassium oxid content in 1600 pounds of mineral is 80 pounds. Considering the molecular weights we have the following equation:—

$$K_2O : 2NaCl : 94 : 116.$$

The amount of salt to balance the amount of $K_2O$ would be

$$Salt = 80 \times \frac{116}{94} = 100 \text{ pounds, approximately.}$$

Consequently, the amount of salt which I actually use is approximately double the amount required to balance the potassium oxid content in the mineral. My aim is to use about as much lime as salt and with this in view, I use about 400 pounds of limestone which, when heated, as hereinafter explained, is approximately the equivalent of 200 pounds of lime.

I then heat the mixture at a low red heat, which is 800 to 1000° C., for a period which should not exceed one hour. This dehydrates the mineral but I carefully avoid sintering; and I find that by avoiding a temperature which would produce sintering I can maintain the heat for one hour without volatilizing any substantial amount of the potassium content. I find in practice, that this makes it possible to leach out about 90% of the potassium content. Any commercial leaching method may be employed, after which the solution is filtered, preferably in a continuous vacuum filter. The filtrate is then evaporated and crystallized in any desirable manner.

One of the important characteristics of the process is that the solution or brine resulting from the leaching step contains such a relatively small amount of sodium chlorid and calcium hydrate which, so far as utility is concerned, constitute an impediment or impurity in the product. In one recent case of the prior art it is proposed to use clay, 5 parts; sodium carbonate, 3 parts; and sodium chlorid, 2 parts. In other words, the amount of compounds added is equal to the total amount of the raw material treated. By my process I avoid waste of salt, and, by the same token, avoid the labor and expense of handling it, and also the disadvantage of its presence.

For heating, it is desirable to employ a rotary kiln furnace and after the material has been properly heat-treated and leached it is filtered preferably through continuous vacuum filters. For evaporating it is desirable to employ crystallizing type vacuum evaporators which, in view of their rapid circulation, prevent to a large extent any clogging of the apparatus.

It will also be understood that the proportions hereinabove given are not absolute, but are approximate, and are specified in order to disclose the manner of obtaining the best results,—all things considered and under ordinary circumstances.

Having thus described my invention what I claim as new and desire to secure by Letters Patent, is:

1. The process of obtaining a soluble potassium compound from hydrous potassium-containing silicates which consists in comminuting the silicate and mixing it with non-volatile alkali and a metallic chlorid, heating the mixture to a temperature sufficient to dehydrate the silicate and insufficient to produce sintering, and maintaining this temperature for a period from 30 to 60 minutes, and subsequently leaching out the resulting soluble potassium compound.

2. The process of obtaining a potassium compound in soluble form from a hydrous silicate such as clay, shale or slate, consisting in grinding the silicate and mixing with it sodium chlorid and an alkaline earth metal carbonate, calcining the mixture for a period of approximately, but not to exceed one hour, at a temperature insufficient to produce sintering, then leaching out the soluble potassium compound.

3. The process of obtaining a soluble potassium compound from hydrous, potassium-containing silicate consisting in grinding clay, shale or slate containing combined potassium oxid, mixing with it a metallic chlorid and limestone, the chlorid being of a weight about equal to one half of the weight of the limestone, heating the mixture to temperature sufficient to dehydrate the silicate and insufficient to produce sintering to any appreciable extent and maintaining this temperature for a period not to exceed one hour, and leaching out the resulting potassium compound.

4. The process of obtaining a soluble potassium compound from a hydrous, potassium-containing silicate, consisting in grinding the silicate, making a mixture of approximately the following proportions: an amount of common salt which will contain approximately twice the amount of sodium required to balance the potassium in the silicate, and an amount of limestone equal approximately to twice the weight of the salt; heating the mixture to a low red heat, care being taken to avoid sintering and to avoid volatilizing the potassium, and leaching out the resulting soluble compounds.

5. The process of obtaining a soluble potassium compound from a hydrous, potassium-containing silicate, consisting in grinding the silicate, making a mixture of approximately the following proportions: an amount of common salt which will contain approximately twice the amount of sodium required to balance the potassium in the silicate, an amount of limestone equal approximately to twice the weight of the salt, heating the mixture for approximately an hour at a low red heat, care being taken to avoid sintering and to avoid volatilizing the potassium, and leaching out the resulting soluble compounds In witness whereof, I have hereunto subscribed my name.

HARRY E. BROOKBY.

Copies of this patent may be obtained for five cents each, by addressing the "Commissioner of Patents, Washington, D. C."